United States Patent

Bülow

[11] Patent Number: 6,016,379
[45] Date of Patent: Jan. 18, 2000

[54] METHOD AND FACILITY FOR EQUALIZING AN ELECTRIC SIGNAL DISTORTED DUE TO INTERFERENCE IN THE OPTICAL DOMAIN

[75] Inventor: Henning Bülow, Stuttgart, Germany

[73] Assignee: Alcatel, Paris, France

[21] Appl. No.: 09/127,475

[22] Filed: Jul. 31, 1998

[30] Foreign Application Priority Data

Aug. 5, 1997 [DE] Germany ............... 197 33 764

[51] Int. Cl.[7] .................................................. G02B 6/00
[52] U.S. Cl. ........................ 385/147; 385/11; 385/31; 359/161
[58] Field of Search .................... 385/147, 31, 11, 385/12, 14, 15; 359/161, 189

[56] References Cited

U.S. PATENT DOCUMENTS

| | | | |
|---|---|---|---|
| 5,481,389 | 1/1996 | Pidgeon et al. | 359/161 |
| 5,793,511 | 8/1998 | Bulow | 359/161 |

FOREIGN PATENT DOCUMENTS

| | | |
|---|---|---|
| 0524758 | 1/1993 | European Pat. Off. . |
| 2308103 | 9/1973 | Germany . |

OTHER PUBLICATIONS

"Electrical Signal Processing Techniques in Long–Haul Fiber–Optic Systems", J. Winters et al, *IEEE Transactions on Communications*, vol. 38, No. 9, Sep. 1990, pp. 1439–1453.

"Automatic compensation technique for timewise fluctuating polarisation mode dispersion in in–line amplifier systems" by T. Takahashi et al, Electronics Letters, vol. 30, No. 4, pp. 348–349.

*Primary Examiner*—Phan T. H. Palmer
*Attorney, Agent, or Firm*—Ware, Fressola, Van Der Sluys & Adolphson LLP

[57] ABSTRACT

An electrical equalizing facility for an electric input signal (S) which was derived from an optical signal (L) transmitted over an optical fiber and which is distorted due to interference in the optical signal (L) as a result of, e.g., polarization mode dispersion (PMD) comprises a number (n>1) of parallel-connected, different, variable electronic equalizers ($E_1, \ldots, E_i, \ldots E_{i,m}$), which are supplied with the electric input signal (S), and a control unit (3) for selecting the electric output signal ($S_i$) of the respective best equalizing electronic equalizer ($E_i$) and for controlling the equalization parameters ($E_{i,1}, \ldots, E_{i,m}$) of this equalizer in such a way that the quality (Q) of its equalized signal ($S_i$) is optimized. This makes it possible to select the equalizer currently operating satisfactorily.

13 Claims, 1 Drawing Sheet

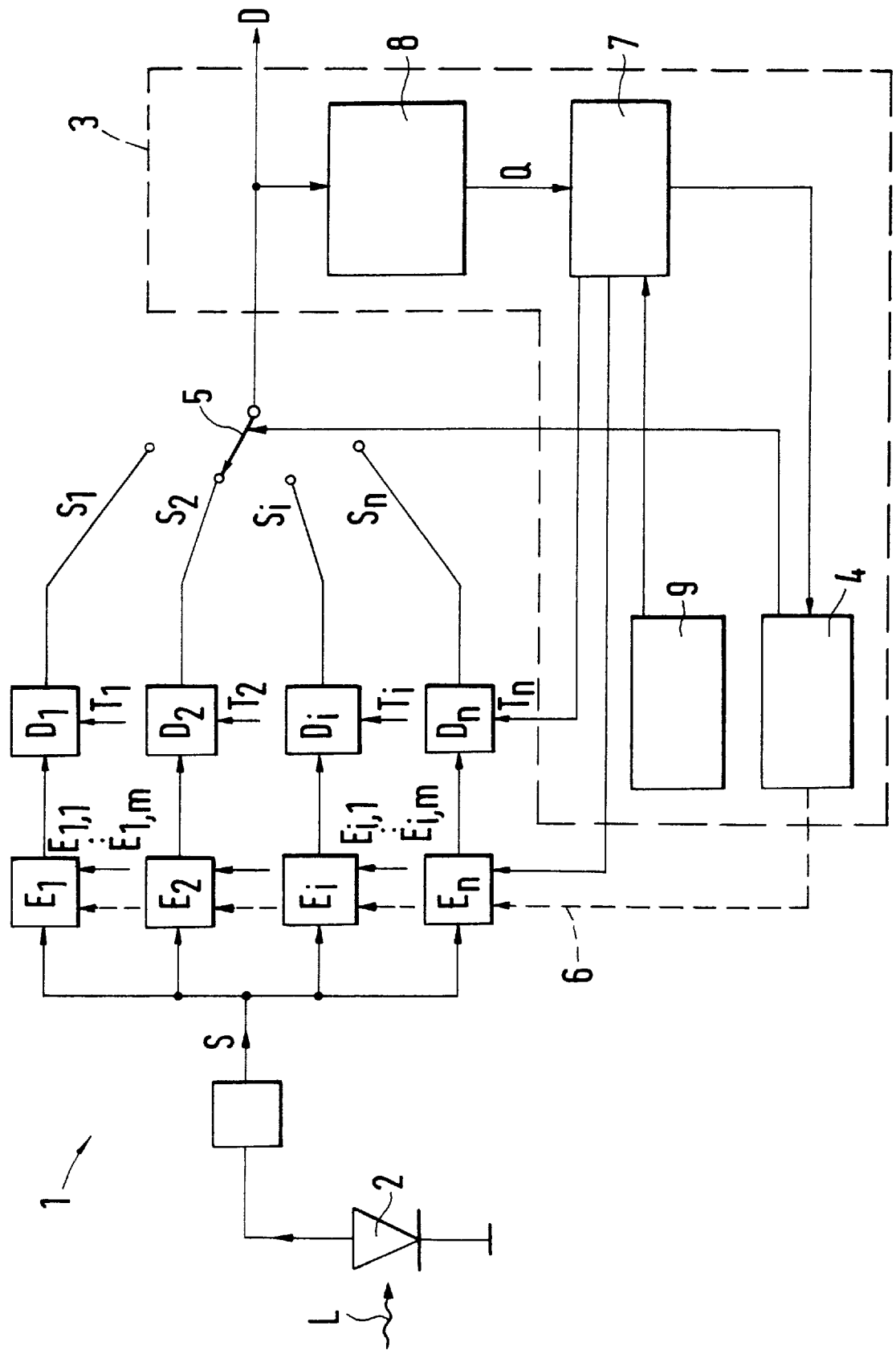

METHOD AND FACILITY FOR EQUALIZING AN ELECTRIC SIGNAL DISTORTED DUE TO INTERFERENCE IN THE OPTICAL DOMAIN

BACKGROUND OF THE INVENTION

1. Technical Field

This invention relates to a method of finding the best possible equalization of an electric input signal which was derived from an optical signal transmitted over an optical fiber and which is distorted due to interference in the optical signal, particularly as a result of polarization mode dispersion (PMD), and to an electrical equalizing facility for such an electric input signal comprising an electronic equalizer.

2. Discussion of Related Art

Such an electrical equalizing facility is described, for example, in an article by J. Winters et al, "Electrical Signal Processing Techniques in Long-Haul Fiber-Optic Systems", IEEE Transactions on Communications, Vol. 38, No. 9, 1990, pages 1439 to 1453.

Polarization mode dispersion (PMD), which occurs in single-mode fibers, manifests itself in a two-way propagation of an optical signal. If a fiber exhibits birefringence, i.e., different propagation conditions for the two orthogonal directions of polarization (principal axes), the fundamental mode is split into two modes polarized in mutually perpendicular planes. Along these two principal axes of the fiber, the optical signal propagates at different group velocities, i.e., a "fast" and a "slow" signal component results. The PMD can be sufficiently characterized as a function of two quantities, e.g., by the time difference AT between the "fast" and "slow" signal components and by the relative power $\gamma$ in one of the principal axes. In connection with very-high-bit-rate optical transmission on optical fibers (>2.5 Gb/s), PMD may occur as a property which limits the transmission rate (maximum transmission distance).

From an article by T. Takahashi et al, "Automatic compensation technique for timewise fluctuating polarisation mode dispersion in in-line amplifier systems", Electronics Letters, Vol. 30, No. 4, 1994, pages 348/349, it is known to compensate for PMD-induced signal distortions in the optical domain by adaptively inserting an opposite birefringence in the optical signal path, thereby reducing the distortion. This is accomplished by inserting a polarization controller and an optical delay line in the optical signal path in front of the optical receiver.

PMD compensation in the electrical domain is known from the above-mentioned article by J. Winters et al. To compensate for linear distortion, a linear electronic equalizer is provided in an optical receiver after the photodiode. For the electronic equalizer, an electronic filter with N taps is used as a branching delay line. Both transversal filters and decision feedback equalizers (DFEs) are proposed whose parameters are caused to track the time-varying PMD.

Since the PMD is not constant over time, in the optical domain, the delay line would have to be adapted to the time-varying PMD, which would only be possible with a large amount of circuitry. In the electrical domain, the problem is that with a transversal filter, for example, compensation is not possible for $\gamma=0.5$, where $\gamma$ is the relative ratio of the powers in the two states of polarization. A DFE, in turn, does not permit equalization at small y. Since in an electronic equalizer many equalization parameters have to be set independently of each other, finding the best possible equalization of an electric input signal distorted as a result of PMD requires a complex and time-consuming optimization algorithm.

SUMMARY OF INVENTION

It is therefore an object of the present invention to provide both an improved method of finding the best possible equalization of an electric signal distorted as a result of PMD and an improved electrical equalizing facility, particularly for carrying out this method.

The method according to the invention comprises determining the quality of the distorted output signal, determining at least one set of equalization parameters as a function of at least two arbitrarily assumed interference parameters $(P_1, \ldots, P_j)$ which characterize the interference from which the distortion results, with the number of interference parameters being less than the number of equalization parameters of the at least one set, and then varying the interference parameters, and thus the equalization parameters of the at least one set, until the quality of the equalized output signal is optimized.

Preferably, the quality of the equalized output signal and the at least one set of equalization parameters are determined continuously or periodically after predetermined time intervals.

As each set of equalization parameters for an electronic equalizer is uniquely preassigned to one pair of interference parameters or can be uniquely calculated from such a pair of interference parameters, the associated equalization parameters of a set can be determined simply by varying a few interference parameters. Instead of having to adapt all equalization parameters of an electronic equalizer in accordance with the quality of the equalized signal, according to the invention, the variation can be facilitated and accelerated by reduction to only few interference parameters. The best possible equalization of the distorted input signal is obtained if the quality of the electric output signal is optimized, e.g., if the error rate of the output signal is minimal or the eye opening of the output signal is maximal.

In a particularly preferred embodiment of the method according to the invention, an interference caused by polarization mode dispersion (PMD) is characterized by only two interference parameters (PMD parameters) $\Delta\tau$ and $\gamma$, with $\Delta\tau$ being the differential mode delay occurring during transmission of the optical signal along the two principal axes of the optical fiber, and $\gamma$ being the relative power of the, e.g., faster, signal component in one of the principal axes of the optical fiber. The PMD can be theoretically or sufficiently characterized by these two quantities.

If the equalization parameters of the at least one set which are found for an optimally equalized output signal continue to be varied or are varied periodically after predetermined time intervals, they can be adjusted in response to time-varying distortion of the electric input signal. It is also possible to make an adjustment each time the quality of the output signal, characterized, for example, by the eye opening or the bit error rate, has dropped below a predetermined threshold.

The electrical equalizing facility according to the invention is characterized by a number of parallel-connected, different, variable electronic equalizers to which the electric input signal is applied, and by a control unit for selecting the electric output signal of the respective best equalizing electronic equalizer $(E_i)$ and for controlling the equalization parameters of the latter in such a way that the quality of its equalized signal is optimized.

In this equalizing facility consisting of two or more equalizers in accordance with the invention, the equalizer currently operating satisfactorily can be selected. If each equalizer is unambiguously preassigned a given range of interference parameters in which it operates satisfactorily according to experience, the appropriate equalizer can be selected solely on the basis of the determined interference parameters. This embodiment has the essential advantage that the whole range of distortions due to interference can be optimally covered by such equalizers, which provide optimum equalization in the ranges predetermined via the interference parameters. The control unit optimizes the signal quality, tracks the distortion, and determines the optimum equalization parameters of the respective selected equalizer via the respective interference parameters. For the electronic equalizers, linear filters (transversal filters) or decision feedback equalizers (DFEs) can be used. With the equalizing facility according to the invention, the maximum transmission distance can be increased considerably, e.g., tenfold.

One advantage of the invention is that it can be used for PMD compensation and, alternatively or simultaneously, to compensate for distortions having other sources, such as self-phase modulation (SPM), chromatic dispersion, or varying component parameters of, e.g., the transmitter.

In a particularly preferred embodiment, the control unit comprises a selection device which selects the equalized output signal of the best equalizing electronic equalizer for output as a data signal. The selection device may be, for example, a controllable electronic switch which either causes the desired equalizer line to be connected through or activates only the respective equalizer with the best possible equalization.

To be able to continuously adapt the equalization parameters according to the equalized output signal, the equalized output signal of the selected electronic equalizer is fed to the control unit for controlling the set of equalization parameters of this equalizer.

To avoid bit losses or bit doubling during switchover between two electronic equalizers, each electronic equalizer preferably has a variable delay line associated with it whose delay is controlled by the control unit. The delay necessary for switchover between two equalizers can also be fixed in advance in accordance with the interference parameters. The variable delay line may be implemented in digital form, e.g., as a shift register of variable length or with a variable delayed shift register clock. Alternatively, the variable delay line may also consist of sufficiently finely graded lines of different lengths which are switched into or out of circuit.

These delay lines may be provided ahead of or after their associated electronic equalizers. Preferably, however, they are connected ahead of their associated electronic equalizers, which offers advantages during derivation of the clock signal from the distorted input signal, because in that case, no delays additionally caused by the electronic equalizers need be taken into account.

In another preferred embodiment, the control unit includes a signal-monitoring device for determining and following the quality of the electric output signal.

In a further preferred embodiment of the invention, the control unit includes a device for varying the set of equalization parameters found for an optimally equalized output signal so as to be able to adjust the equalization parameters in response to time-varying distortion of the electric input signal.

The invention also relates to an optical receiver with a receiving device, e.g. a photodiode, and an electrical equalizing facility designed as described above.

Further advantages of the invention will become apparent from the following description taken in conjunction with the accompanying drawing. It is to be understood that the aforementioned features and the features described below can be used alone or in arbitrary combinations, and that the description is made only by way of example and not as a limitation to the scope of the invention.

BRIEF DESCRIPTION OF THE DRAWING

The single FIGURE of the drawing is a schematic block diagram of an optical receiver with an electrical equalizing facility according to the invention which is suitable for carrying out the method according to the invention.

DETAILED DESCRIPTION OF PREFERRED EMBODIMENTS

In the optical receiver, generally designated 1 in the FIGURE, a light signal L transmitted over an optical fiber is converted by a receiving device 2 in the form of a photodiode into an electric input signal S which is distorted due to interference in the optical signal as a result of polarization mode dispersion. For equalization, the electric input signal S is fed to n (n>1) parallel-connected, different, variable electronic equalizers $E_1, \ldots, E_i, \ldots, E_n$ of an electrical equalizing facility which are followed by variable delay lines $D_1, \ldots, D_i, \ldots, D_n$, respectively. Of the equalized electric output signals $S_1, \ldots, S_i, \ldots, S_n$ of all electronic equalizers $E_1, \ldots, E_i, \ldots, E_n$, the one with the best possible equalization is output as a data signal D.

Since the equalized signals $S_1, \ldots, S_i, \ldots, S_n$ at the outputs of the different electronic equalizers $E_1, \ldots, E_n$ have different time delays, bit losses or bit doubling, which otherwise occur when switching between two equalizers, are avoided by adjusting suitable delays $T_1, \ldots, T_i, \ldots, T_n$ at the delay lines $D_1, \ldots, D_i, \ldots, D_n$.

The selection of the best equalizing equalizer $E_i$, the determination of the best possible setting of its m equalization parameters $E_{i,1}, \ldots, E_{i,m}$ (i=1, ..., n), and the adjustment of the delays $T_1, \ldots, T_i, \ldots, T_n$ are made by a control unit 3 which optimally adapts these parameters to the current distortion, i.e., to the polarization mode dispersion from which this distortion results.

To accomplish this, the control unit 3 includes a selection device 4 which causes the desired equalized output signal Si to be switched to the output as the data signal D by means of an electronically controllable switch 5. Alternatively, the selection device 4 may activate the best equalizing equalizer $E_i$ via a corresponding selection signal, as is indicated in the FIGURE by the dashed selection line 6.

The respective equalization parameters $E_{i,1}, \ldots, E_{i,m}$ and delays $T_i$ are determined by means of a control logic 7 ("PMD observer") and fed to the equalizer $E_i$ and the delay line $D_i$, respectively. The output signal $S_i$ which is output as the data signal D is fed to a signal-monitoring device 8 ("eye pattern observer") of the control unit 3 which determines the quality Q of the electric output signal $S_i$ based on, e.g., the eye opening or the bit error rate of this signal. The control unit 3 varies the equalization parameters $E_{i,1}, \ldots, E_{i,m}$ by means of a variation device 9 so as to enable the signal-monitoring device 8, or to make it easier for this device, to follow the signal quality Q or the PMD, on which the signal quality depends. The equalization parameters $E_{i,1}, \ldots, E_{i,m}$ are varied until the quality Q of the equalized output signal $S_i$ is optimized.

To adjust the equalization parameters $E_{i,1}, \ldots, E_{i,m}$ found for an optimally equalized output signal $S_i$ in response to time-varying distortion of the electric input signal S, the equalization parameters $E_{i,1}, \ldots, E_{i,m}$ continue to be varied and, if necessary, are controlled so that an optimum signal quality Q is achieved.

To find the best equalization, the control logic 7 determines the set of equalization parameters $E_{i,1}, \ldots, E_{i,m}$ of the selected equalizer $E_i$ as a function of only two arbitrarily assumed PMD parameters $\Delta\tau$ and $\gamma$ which sufficiently characterize the PMD from which the distortion results, $\Delta\tau$ being the differential $_{mode}$ delay occurring during transmission of the optical signal L along the two principal axes of the optical fiber, and $\gamma$ being the relative power in one of the optical axes of the optical fiber. The respective equalization parameters $E_{i,1}, \ldots, E_{i,m}$ and the respective delays $T_i$ can be determined with the aid of known characteristics or tables on the basis of the pair of PMD parameters ($\Delta\tau, \gamma$) representing the PMD. According to the pair of PMD parameters found ($\Delta\tau, \gamma$), the best equalizing equalizer $E_1, \ldots, E_n$ for this pair of parameters is selected via the control logic 7 by suitable control of the switch 5 by means of the selection device 4.

In the embodiment, only the compensation of distortions induced by polarization mode dispersion was discussed. The invention can also be used to compensate for distortions caused by other sources of interference, such as self-phase modulation (SPM), chromatic dispersion, or varying component parameters of, e.g., the transmitter. For this purpose, the interference is characterized by respective corresponding interference parameters.

I claim:

1. A method of finding the best possible equalization of an electric input signal (S) which was derived from an optical signal (L) transmitted over an optical fiber and which is distorted due to interference in the optical signal, said method comprising the steps of:

determining the quality (Q) of the distorted output signal ($S_1, \ldots, S_i, \ldots, S_n$);

determining at least one set (i) of equalization parameters ($E_{i,1}, \ldots, E_{i,m}$) as a function of at least two arbitrarily assumed interference parameters ($P_1, \ldots, P_j$) which characterize the interference from which the distortion results, with the number (j) of interference parameters ($P_1, \ldots, P_j$) being less than the number (m) of equalization parameters ($E_{i,1}, \ldots, E_{i,m}$) of the at least one set (I); and then varying the interference parameters ($P_1, \ldots, P_j$), and thus the equalization parameters ($E_{i,1}, \ldots, E_{i,m}$) of the at least one set (i) until the quality (Q) of the equalized output signal ($S_1, \ldots, S_i, \ldots, S_n$) is optimized.

2. A method as claimed in claim 1 wherein the interference in the optical signal is caused by polarization mode dispersion (PMD), and wherein the at least two interference parameters are PMD parameters.

3. A method as claimed in claim 2, characterized in that the PMD is characterized only by the two PMD parameters $\Delta\tau$ and $\gamma$, with $\Delta\tau$ being the differential mode delay occurring during transmission of the optical signal (L) along the two principal axes of the optical fiber, and $\gamma$ being the relative power in one of the principal axes of the optical fiber.

4. A method as claimed in claim 1 wherein the quality (Q) of the equalized output signal ($S_1, \ldots, S_i, \ldots, S_n$) and the equalization parameters ($E_{i,1}, \ldots, E_{i,m}$) are determined periodically.

5. A method as claimed in claim 4, characterized in that the equalization parameters ($E_{i,1}, \ldots, E_{i,m}$) of the at least one set (i) which are found for an optimally equalized output signal ($S_1, \ldots, S_i, \ldots, S_n$) continue to be varied.

6. An electrical equalizing facility for an electric input signal (S) which was derived from an optical signal (L) transmitted over an optical waveguide and which is distorted due to interference in the optical signal (L), said electrical equalizing facility comprising an electronic equalizer, characterized by a number (n>1) of parallel-connected, different, variable electronic equalizers ($E_1, \ldots, E_i, \ldots, E_n$) to which the electric input signal (S) is applied, and by a control unit (3) for selecting the electric output signal ($S_i$) of the respective best equalizing electronic equalizer ($E_i$) and for controlling the equalization parameters ($E_{i,1}, \ldots, E_{i,m}$) of said best equalizing electronic equalizer in such a way that the quality (Q) of its equalized output signal ($S_i$) is optimized.

7. An electronic equalizing facility as claimed in claim 6, characterized in that each electronic equalizer ($E_1, \ldots, E_i, \ldots, E_n$) has a variable delay line ($D_1, \ldots, D_i, \ldots, D_n$) associated with it whose delay ($T_1, \ldots, T_i, \ldots, T_n$) is controlled by the control unit (3).

8. An electrical equalizing facility as claimed in claim 7, characterized in that the delay lines ($D_1, \ldots, D_i, \ldots, D_n$) are connected ahead of their respective associated electronic equalizers ($E_1, \ldots, E_i, \ldots, E_n$).

9. An electrical equalizing facility as claimed in claim 6, characterized in that the control unit (3) comprises a selection device (4) which selects the equalized output signal ($S_i$) of the best equalizing electronic equalizer ($E_i$) for output as a data signal (D).

10. An electrical equalizing facility as claimed in claim 6, characterized in that the control unit (3) is fed by the equalized output signal ($S_i$) of the best equalizing electronic equalizer ($E_i$) for controlling the set of equalization parameters ($E_{i,1}, \ldots, E_{i,m}$) of said best equalizing electronic equalizer ($E_i$).

11. An electrical equalizing facility as claimed in claim 6, characterized in that the control unit (3) includes a signal-monitoring device (8) for determining the quality (Q) of the electric output signal ($S_i$).

12. An electrical equalizing facility as claimed in claim 6, characterized in that the control unit (3) includes a device (9) for varying the set of equalization parameters ($E_{i,1}, \ldots, E_{i,m}$) found for an optimally equalized output signal ($S_i$).

13. An optical receiver (1) with a receiving device (2) and with an electrical equalizing facility for an electric input signal (S) which was derived from an optical signal (L) transmitted over an optical waveguide and which is distorted due to interference in the optical signal (L), said electrical equalizing facility comprising an electronic equalizer, characterized by a number (n>1) of parallel-connected, different, variable electronic equalizers ($E_1, \ldots, E_i, \ldots, E_n$) to which the electric input signal (S) is applied, and by a control unit (3) for selecting the electric output signal ($S_i$) of the respective best equalizing electronic equalizer ($E_i$) and for controlling the equalization parameters ($E_{i,1}, \ldots, E_{i,m}$) of said best equalizing electronic equalizer in such a way that the quality (Q) of its equalized output signal ($S_i$) is optimized.

* * * * *

UNITED STATES PATENT AND TRADEMARK OFFICE
CERTIFICATE OF CORRECTION

PATENT NO.  : 6,016,379
DATED       : January 18, 2000
INVENTOR(S) : H. Bulow

It is certified that error appears in the above-identified patent and that said Letters Patent is hereby corrected as shown below:

Title page, item [57], Abstract,
line 8, please cancel "$(E_1, \ldots, E_i, \ldots E_{i,m})$" and substitute --$(E_1, \ldots, E_i, \ldots, E_n)$-- therefor.

Signed and Sealed this

Fourteenth Day of November, 2000

Attest:

Q. TODD DICKINSON

*Attesting Officer*  *Director of Patents and Trademarks*